No. 763,451. PATENTED JUNE 28, 1904.
C. C. ADELSPERGER.
VEHICLE BODY.
APPLICATION FILED OCT. 23, 1903.
NO MODEL. 3 SHEETS—SHEET 1.
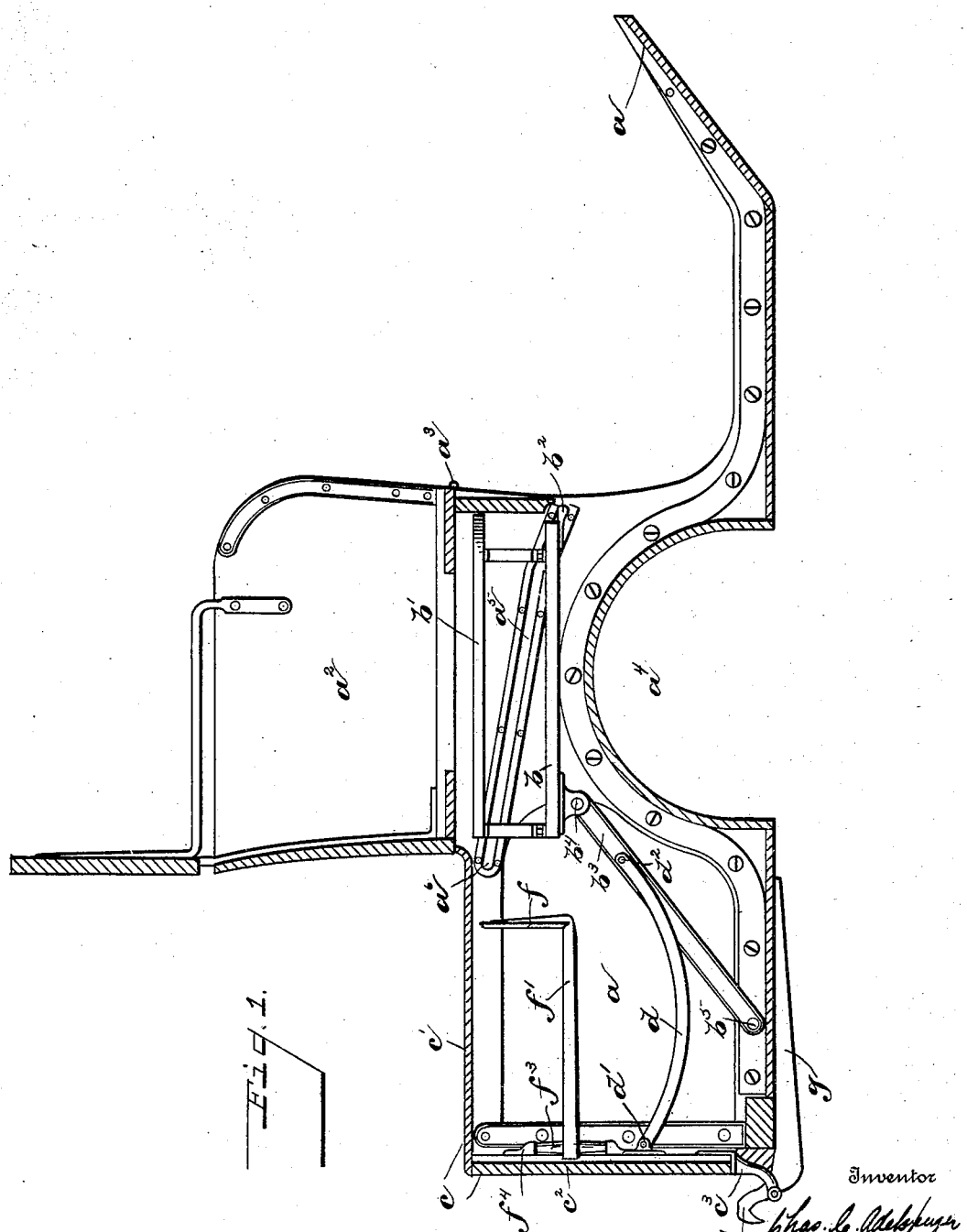

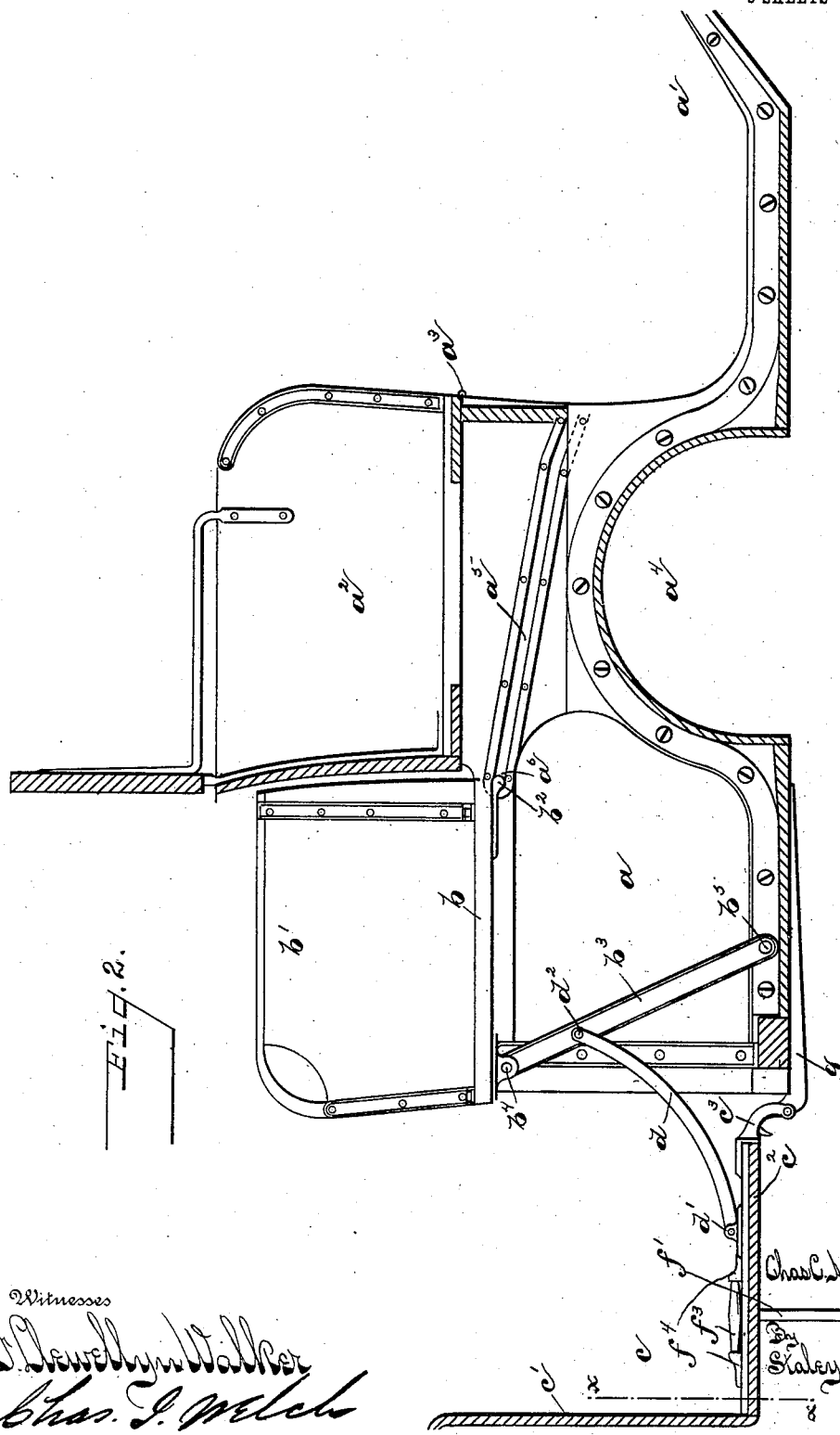

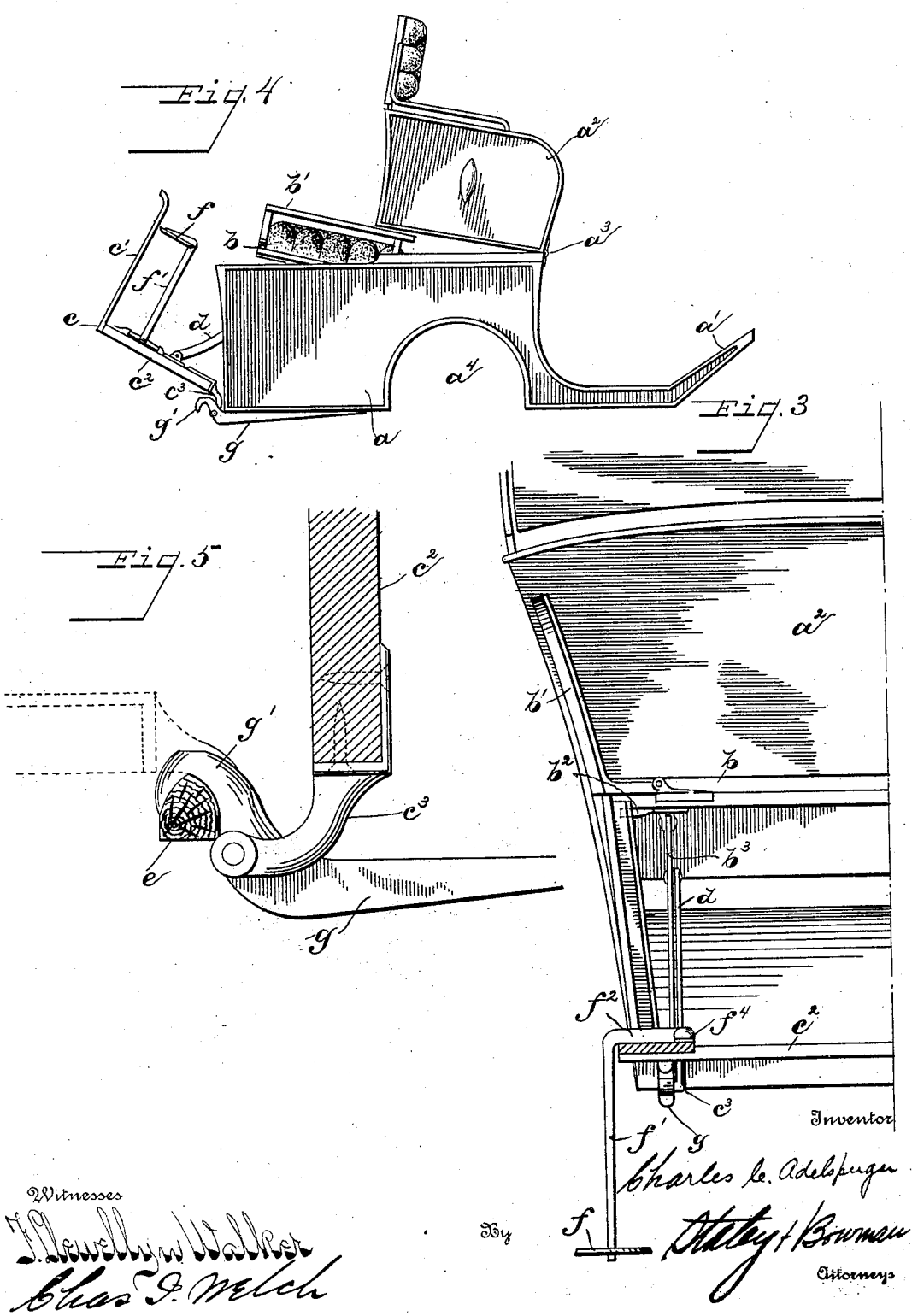

No. 763,451. Patented June 28, 1904.

UNITED STATES PATENT OFFICE.

CHARLES C. ADELSPERGER, OF UNION CITY, INDIANA, ASSIGNOR TO UNION CITY BODY COMPANY, OF UNION CITY, INDIANA, A CORPORATION OF INDIANA.

VEHICLE-BODY.

SPECIFICATION forming part of Letters Patent No. 763,451, dated June 28, 1904.

Application filed October 23, 1903. Serial No. 178,213. (No model.)

*To all whom it may concern:*

Be it known that I, CHARLES C. ADELSPERGER, a citizen of the United States, residing at Union City, in the county of Randolph and State of Indiana, have invented certain new and useful Improvements in Vehicle-Bodies, of which the following is a specification.

My invention relates to improvements in vehicle-bodies, and especially to that class of vehicles in which a shifting seat is employed.

The object of my invention is to provide improved means for operating and supporting the shifting seat and also to provide, in connection with said shifting seat, a movable body portion so constructed that when the seat is in one position the said movable body portion will form a rear foot-board and dash for the body, and when the seat is shifted to its folded or inoperative position the said movable body portion will form the rear body-panel and upper deck for the vehicle-body, a further object being to so hinge and support the said movable body portion to the main body as to permit the movable portion to occupy a position free from interference with the rear cross-spring bar when the said movable body portion is shifted to a position to form the foot-board and dash.

A further object is to provide a folding step for the said movable body portion so constructed as to be folded into the main body when the parts are shifted to their closed or folded position.

The invention consists in the constructions and combinations of parts hereinafter described, and set forth in the claims.

In the accompanying drawings, Figure 1 is a side elevation in section of a vehicle-body having my improved constructions, showing the parts in their folded positions to present a vehicle of the Stanhope type. Fig. 2 is a side elevation in section of the same, showing the parts shifted to their open or unfolded position, the style thus presented being what is commonly known as a "trap." Fig. 3 is a rear vertical sectional view taken on the line $xx$ of Fig. 2, the parts being in the position shown in said Fig. 2. Fig. 4 is a side elevation showing the parts in a partly-shifted position. Fig. 5 is a detail view of one of the body-loops which form the support for the rear foot-board and dash.

Like parts are represented by similar letters of reference in the several views.

In the said drawings, $a$ represents a vehicle-body of ordinary construction having the usual front dash $a'$ and forward seat $a^2$, said seat being hinged in the front in this case, as at $a^3$.

$a^4$ represents an ordinary wheel-house, which is shown in the style of body illustrated here, but which may be used or not, as desired.

$b$ represents the shifting rear seat, having folding side arms $b'$ of the usual construction. Secured to the under side of the front portion of said shifting seat, at each side thereof, is a laterally-extending guiding and supporting finger $b^2$, each of said fingers being adapted to extend into a grooveway $a^5$, formed in the respective sides of the vehicle-body, beginning at a point in said body which lies adjacent to said fingers when the shifting seat is in its open or unfolded position and extending forwardly in said body to a suitable distance. The said grooveway may be constructed in any suitable manner, either by mortising in the body proper or by securing metal or other strips to the body, as shown. To the under side of the rear portion of said shifting seat $b$, at each side thereof, are pivotally secured at $b^4$ supporting-legs $b^3$, which legs are pivotally connected at their lower ends to the respective sides of the vehicle-body, as shown at $b^5$, the said fingers $b^2$ and legs $b^3$ forming the support for said seat.

At the rear end of the main vehicle-body $a$ I provide a movable body portion $c$, the part $c'$ of which is adapted when unfolded to form the rear dash and when folded to form the upper deck of the main body and the part $c^2$ when unfolded the rear foot-board and when folded the rear body-panel of said main body. This movable body portion is hinged to the rear lower end of the main body by means of brackets $c^3$, pivoted to body-loops $g$, one of 8. In a vehicle, a main body, a shifting seat therein, a movable body portion connected to said main body adapted to be swung to positions to form, respectively, a rear foot-board and dash and a rear panel and deck, a step connected to said movable body portion, and means for swinging said step to a position to be folded into the main body when the movable body portion is shifted to form the rare panel and deck, substantially as specified.

In testimony whereof I have hereunto set my hand this 20th day of October, A. D. 1903.

CHARLES C. ADELSPERGER.

Witnesses:
JOHN T. MOFFETT,
ELMER E. WHITE.